Feb. 23, 1965
E. E. HILDEBRANDT ETAL
3,170,712
SUSPENSION RIDE CONTROL
Filed April 21, 1961
3 Sheets-Sheet 1
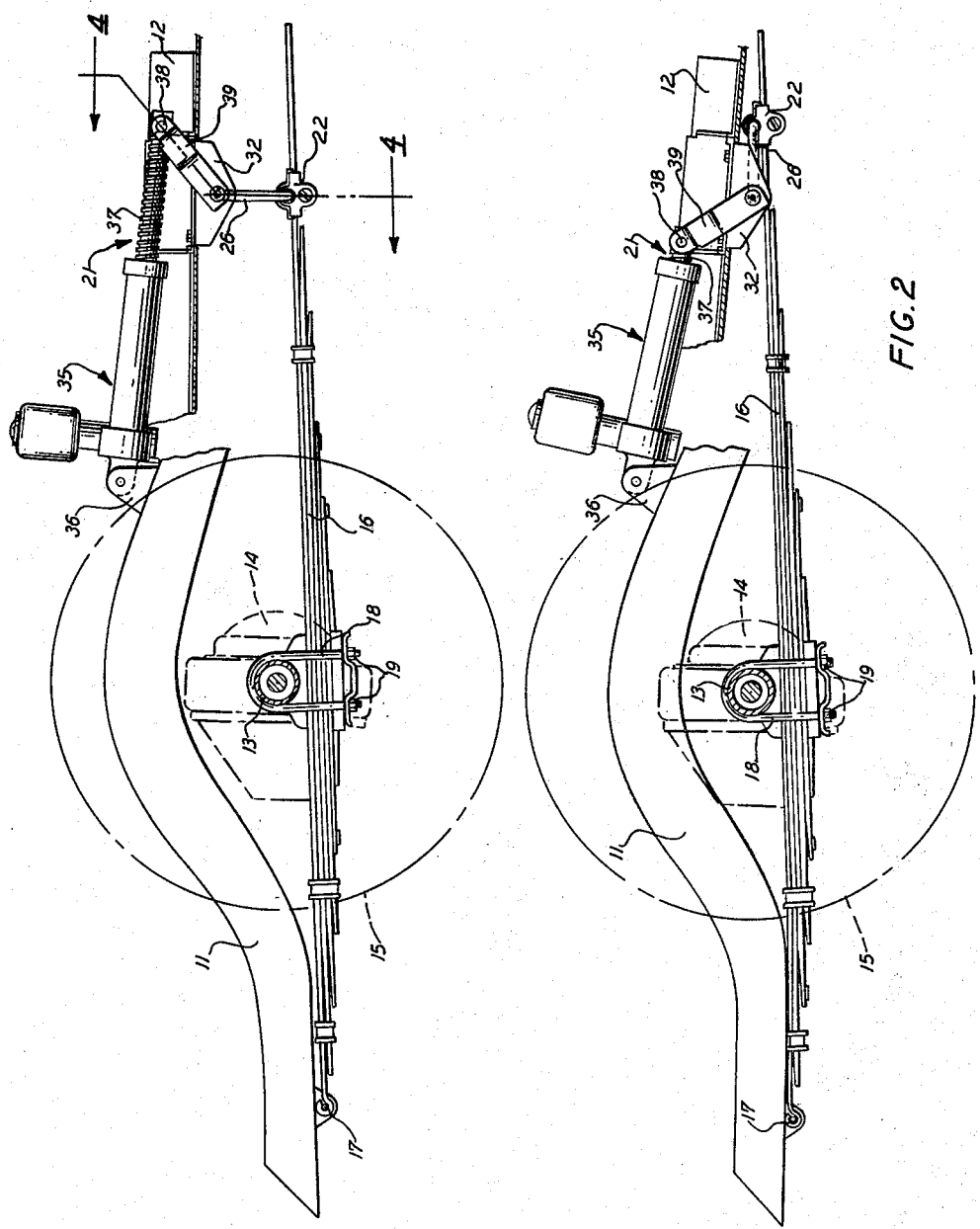
EUGENE E. HILDEBRANDT
JULIUS B. SCHULTZ
INVENTORS
BY John R. Paulkner
Clifford L. Sadler
ATTORNEYS Feb. 23, 1965     E. E. HILDEBRANDT ETAL     3,170,712
SUSPENSION RIDE CONTROL
Filed April 21, 1961     3 Sheets-Sheet 2
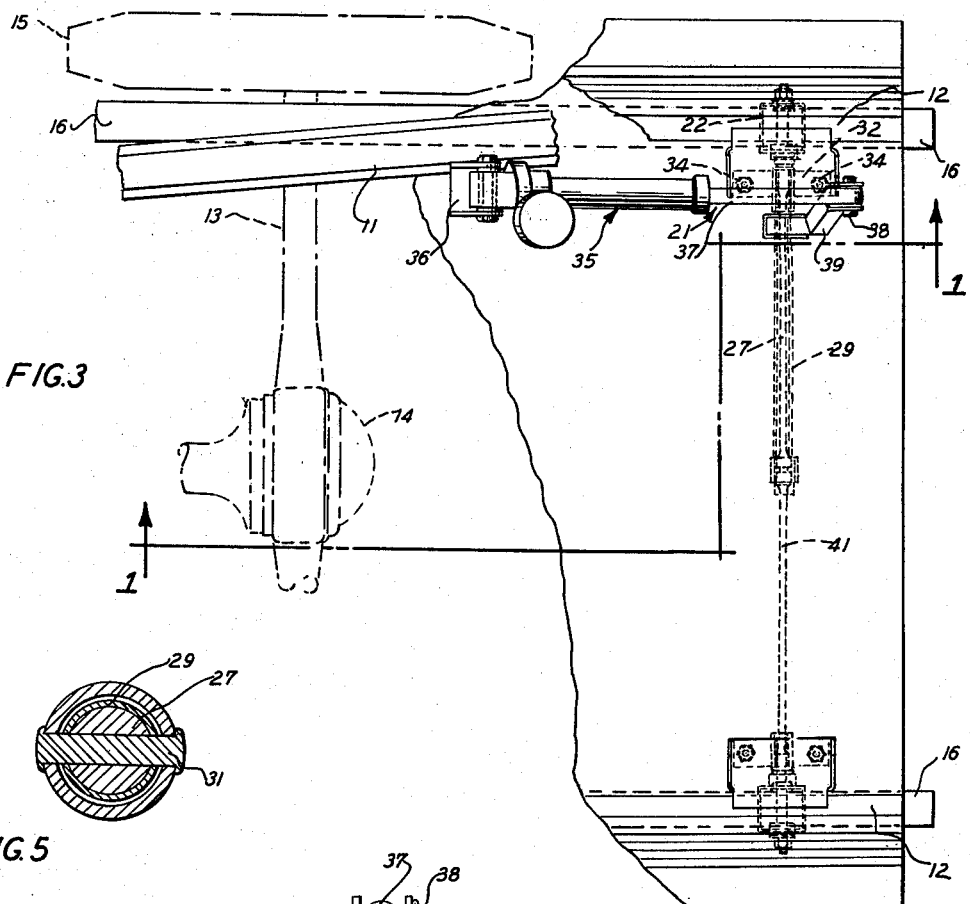
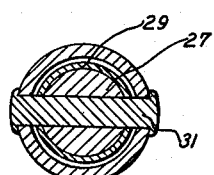
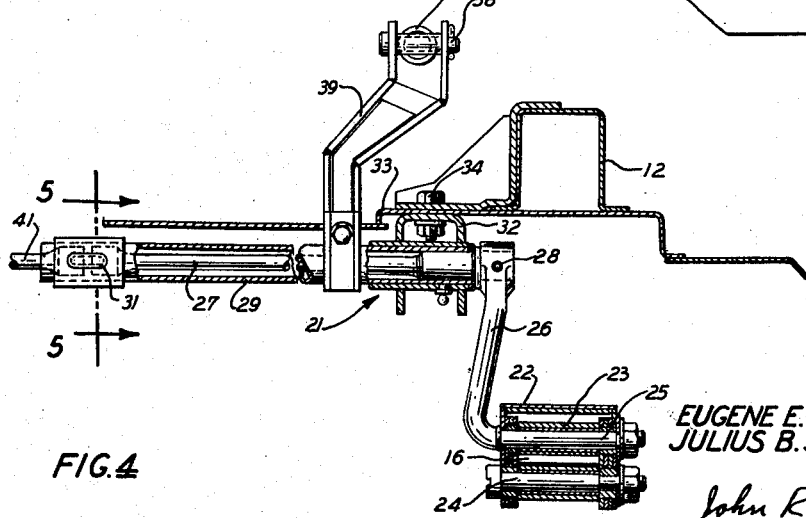
EUGENE E. HILDEBRANDT
JULIUS B. SCHULTZ
          INVENTORS
BY John R. Faulkner
    Clifford L. Sadler
          ATTORNEYS

EUGENE E. HILDEBRANDT
JULIUS B. SCHULTZ
INVENTOR.

United States Patent Office 3,170,712
Patented Feb. 23, 1965

3,170,712
SUSPENSION RIDE CONTROL
Eugene E. Hildebrandt, Northville, and Julius B. Schultz, Detroit, Mich., assignors to Ford Motor Company, Dearborn, Mich., a corporation of Delaware
Filed Apr. 21, 1961, Ser. No. 104,558
9 Claims. (Cl. 280—124)

This invention relates to motor vehicle suspension systems and more particularly to a vehicular suspension that simultaneously adjusts the vehicular ride level and ride rate.

Motor vehicles are subjected to widely varying conditions of loading in their normal operation. Conventional vehicular suspension systems evidence certain undesirable ride characteristics when subjected to varying loads. The vehicular ride level and ride frequency decrease as the load in the vehicle increases. This seriously affects the vehicle's ride qualities and ground clearance. These changes in ride characteristics result because the rate of the conventional suspension spring is substantially constant regardless of the vehicle load.

Because it is impossible to provide optimum ride characteristics under all degrees of loading with a constant rate suspension spring, the conventionally suspended motor vehicle represents a design compromise. With the design degree of loading the vehicle possesses satisfactory ride characteristics. Deviations from the design loading, however, produce unsatisfactory ride characteristics. A lightly loaded vehicle will have a harsh choppy ride while a heavily loaded vehicle will produce an unduly soft ride having high amplitude oscillations which are difficult to control.

Suspension systems have been proposed which give substantially uniform ride characteristics for varying degrees of loading. These systems are, for the most part, extremely complex. They also generally require complete redesign of the vehicle to accommodate the suspension system.

It has also been proposed to modify existing suspension systems to produce uniform ride characteristics. Helper springs and mechanical ride levelers are examples of modifications of this type. The conventional helper spring, although producing a variable rate suspension, possesses no ride leveling characteristics. The resulting ride of the helper spring devices is often quite harsh, particularly when the vehicle is heavily loaded. The mechanical ride level controls known either fail to provide a ride rate control or furnish inadequate control.

The patent application of John R. Hollowell, Serial No. 68,468, filed November 10, 1960, now Patent No. 3,083,034, and assigned to the assignee of the present invention, provides a suspension system in which the vehicular ride level and ride rate are simultaneously adjusted in an attempt to give substantially uniform ride conditions under all degrees of loading. In the suspension system of the Hollowell application, a conventional vehicular suspension system incorporating a leaf spring is modified to provide a shortening of the effective length of the spring concurrently with an increase in the vehicular ride level. Shortening of the spring produces an increase in its rate. This system offers a marked improvement over the conventional suspension system in producing a more uniform ride under varying loads. A great deal may still be done, however, to produce an even greater degree of uniformity of ride characteristics.

It is an object of the present invention to provide a vehicular suspension that will simultaneously adjust the vehicular ride level and ride rate to produce substantially uniform ride characteristics under all degrees of loading.

It is a further object of this invention to provide an adjustable suspension system that is simple and may be readily adapted to conventional vehicular constructions.

This invention provides a mechanism that concurrently changes the rate of the conventional suspension spring as it adjusts the vehicular ride level. An additional spring is provided through which a portion of the load on the primary suspension spring is transmitted. The mechanism that adjusts the ride level concurrently changes the portion of the load transmitted through the additional spring provided. This provides an increased rate of change of the overall spring rate of the system to result in substantially uniform ride characteristics regardless of the degree of loading.

Further objects and advantages of this invention will become more obvious as this description proceeds, particularly when considered in conjunction with the accompanying drawings, wherein:

FIGURE 1 is a side elevational view of a portion of a motor vehicle incorporating the present invention, taken along line 1—1 of FIGURE 3, showing the ride control mechanism in one position.

FIGURE 2 is a view, in part similar to FIGURE 1, showing the ride control mechanism in another position.

FIGURE 3 is a top plan view of the mechanism shown in FIGURE 1.

FIGURE 4 is a cross sectional view taken along line 4—4 of FIGURE 1.

FIGURE 5 is a cross sectional view taken along line 5—5 of FIGURE 4.

Figure 6:
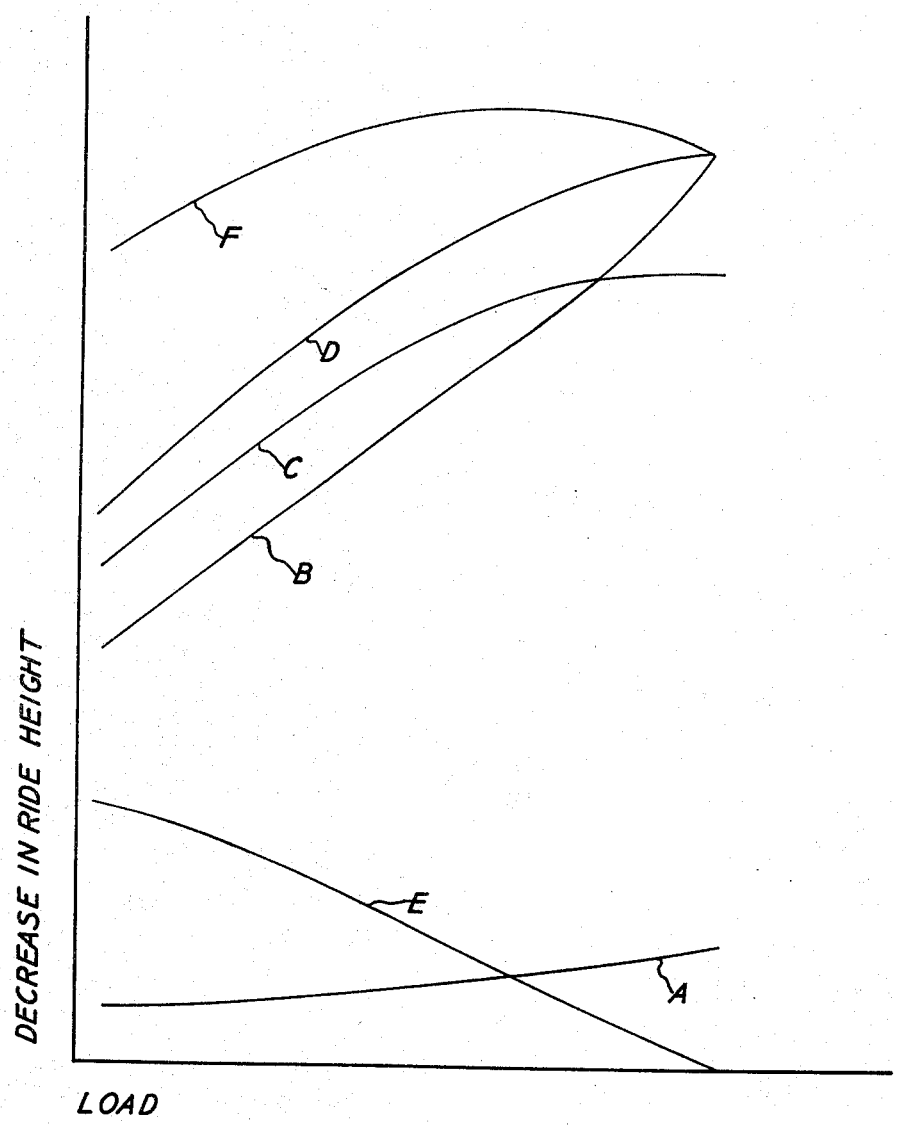
FIGURE 6 is a graph showing the ride characteristics of the present invention in comparison with certain prior art devices.

Referring now in detail to the drawings, a portion of a vehicular chassis structure having chassis members 11 and 12 is shown. Members 11 and 12 may constitute portions of the frame of a conventionally constructed vehicle or suitable structural members of a unit constructed vehicle.

Although the suspension disclosed may be used at any or all of the vehicle wheels, a rear suspension system is illustrated. The rear axle housing 13, differential 14 and wheel 15 are shown in phantom inasmuch as their detail forms no part of the present invention.

The vehicle chassis and body are suspended for movement relative to wheel 15 by a leaf spring 16. At its forward end, leaf spring 16 is connected to chassis member 11 as by a conventional spring hanger 17. The axle housing 13, which forms a portion of the unsprung mass of the vehicle, is connected to leaf spring 16 by the U bolt 18 and nuts 19.

The rear spring shackle conventionally employed is replaced in the present invention by the ride control mechanism generally indicated at 21. The rear portion of leaf spring 16 is contacted by a movable support member 22. The leaves of spring 16 are received between the rollers 23 and 24 of support member 22 (see FIGURE 4). Roller 23 is rotatably supported by the outturned extension 25 of an arm 26. The uppermost end of arm 26 is rigidly secured to the outboard end of a torsion bar spring 27 as by the screw 28.

A substantially rigid tubular member 29 is concentrically disposed around torsion bar 27. Tubular member 29 and the inboard end of torsion bar spring 27 are keyed together as at 31 (see FIGURE 5). Tubular member 29 is rotatably supported by a bracket 32. Bracket 32 is secured to the underbody structure 33 as by the bolts 34. The outboard end of torsion bar 27 is supported by the tubular member 29, however, it is rotatable relative thereto.

Rotary movement of tubular member 29 and torsion bar 27 changes the angular position of arm 26 and the position at which spring support member 22 contacts leaf spring 16. This movement concurrently changes the ride level, the portion of the load transmitted through torsion bar 27, and the effective rate of leaf spring 16, as will be described.

To effect rotary movement of tubular member 29, a power actuated screw jack 35 is provided. Screw jack 35 is pivotally supported on chassis member 11 as by the bracket 36. The output member 37 of screw jack 35 is pivotally connected, as by pin 38, to the upper end of an arm 39. Arm 39 is secured to tubular member 29 for movement therewith. Actuation of screw jack 35 causes movement of support member 22 by means of the interconnecting mechanism described.

In the illustrated embodiment a single jack screw unit 35 simultaneously controls the ride level at each side of the vehicle. To this end, the inboard end of tubular member 29 is connected by key 31 to a separate torsion bar spring 41 that extends across the vehicle to the side opposite that previously described. Torsion bar 41 is connected to a spring support substantially similar to that previously described. Rotation of tubular member 29 thereby simultaneously adjusts the ride rate and level at each side of the vehicle.

It is to be understood that, if so desired, the suspension system at each side of the vehicle could be independently operated. It will be further understood that the leveling may be accomplished either automatically by controlling screw jack 35 by any of the known automatic leveling switches or selectively by the operator's control.

Operation

As has been noted, the ride of a vehicle is affected primarily by the combined effect of the rate of the suspension springs, the springs' frequency and the vehicle loading. The spring rate and loading affect the body ride level in accordance with the following relation:

$$h = \frac{W}{R} \quad (1)$$

where:
$h$ = decrease in ride height
$W$ = load
$R$ = spring rate

The frequency of the spring may be expressed by the following function:

$$f = k\sqrt{\frac{R}{W}} \quad (2)$$

where:
$f$ = spring frequency
$k$ = a constant
$R$ = spring rate
$W$ = load

To maintain uniform ride conditions, it is essential that the vehicle ride level and ride frequency be constant under all conditions of loading. If this uniformity is maintained, the proper selection of spring frequency at design conditions will produce a satisfactory ride regardless of the actual load.

An examination of Equations 1 and 2 reveals that both the ride height and ride frequency are directly related to the ratio of vehicle load to spring rate. Uniform ride characteristics can thereby be insured if the spring rate is varied in the proper relation to vehicle load.

Referring now to FIGURE 6, there are shown, for comparison purposes, the plots of several forms of vehicular suspension systems. In FIGURE 6, the abscissa represents the vehicle loading and the ordinate represents the total decrease in ride height. A suspension system in which the ratio of vehicle load to spring rate was constant for all degrees of load would appear in FIGURE 6 as a straight line having no slope. This would represent the ideal ride condition inasmuch as ride height and ride frequency would then be constant.

A suspension system utilizing a constant rate spring would appear in FIGURE 6 as a straight line having a slope. The slope would be determined by the spring rate. A conventional suspension spring produces a curve which substantially approximates such a plot.

It should be noted that the total deflection or decrease in ride level of the vehicle is equal to the sum of the deflection of the tire and the deflection due to the spring. The plot designated A represents the deflection of the tire. This curve will be the same for all suspension systems. The plot designated B represents the total deflection curve of a conventional suspension system. The plot reveals that the constant rate spring conventionally employed will produce widely varying ride characteristics as the vehicle load varies.

The Hollowell patent application, Serial No. 68,468, previously referred to, provides a suspension system in which the ride rate and level are simultaneously adjusted. The rate change in this device is accomplished by changing the effective length of a leaf spring. Plot C represents the deflection curve produced by the variable rate leaf spring of this device. Plot D represents the combined change in height due to the spring and tire as represented by the sum of plots C and A. It may be seen that this suspension system produces less variance in ride characteristics than the conventional suspension. This device, however, fails to produce completely uniform ride characteristics. The effect of the tire deflection adversely affects the performance of this device as should be readily apparent from the relative shapes of plots D and C.

The Hollowell suspension system, represented by plot D, approaches ride uniformity under conditions of maximum loading. The change in the spring rate due to change in length fails, however, to provide uniform ride height and frequency under light or partial load conditions. The present invention utilizes the basic principle of the Hollowell system, but also provides increased change in overall spring rate allowing greater deflections in vehicle height under conditions of partial load. This insures more uniform ride characteristics at all loads.

The increased change in overall spring rate at partial load conditions is accomplished through the use of an additional spring which acts in series with the primary suspension spring. The use of two springs in series produces greater deflections than would result from either spring used alone. The total deflection is equal to the sum of the deflections of each spring taken alone. As total load increases, the need for the additional spring decreases and accordingly its effect is proportionately reduced.

The operation of the device may be readily understood with reference to FIGURES 1 and 2. FIGURE 2 illustrates the mechanism as it appears when the vehicle is unloaded. In this position, arm 26 is substantially horizontal and the ride height is at a minimum. To raise the ride level, screw jack 35 is actuated causing crank arm 39 to pivot. This rotates tubular member 29 and torsion bar 27 to cause lever 26 to move toward the vertical position 3 shown in FIGURE 1, with a corresponding increase in ride height. Simultaneously with the change in ride height, the total spring rate of the suspension system is increased. This is accomplished in the manner to be described.

As will be noted from FIGURES 1 and 2, an increase in ride height is correspondingly accompanied by a change in the position that support 22 contacts leaf spring 16. Upon the application of loads to leaf spring 16, the spring deflects about support 22. The point of support, therefore, determines the effective length of the spring. The rate of a leaf spring varies inversely with the cube of its length. The effective shortening of leaf spring 16, therefore, increases its rate concurrently with an increase in ride level. This change in rate is represented by the plot C in FIGURE 6. This effect is described more fully in the Hollowell application noted.

The force exerted upon the leaf spring 16 is transmitted by spring support 22 to the arm 26. This force is divided into two components, a vertical force component which reacts directly upon bracket 32 and a torque exerted upon torsion bar 27. The torque exerted upon torsion bar 27 deforms the bar and causes a further decrease in body ride level.

The amount of torque exerted upon torsion bar 27 and the amount of deflection of the bar is dependent upon the angular position of arm 26. With arm 26 in the substantially horizontal position shown in FIGURE 2, the effective load arm for torsion bar 27 is approximately equivalent to its length. As arm 26 moves into the vertical position shown in FIGURE 1, a progressive decrease in the effective load arm results. As the load arm decreases, the torque exerted upon torsion bar 27 decreases and accordingly the deflection of the torsion bar is reduced. This effect can be seen in the plot E of FIGURE 6 which represents decrease in ride height due to the deflection of torsion bar 26.

As has been noted, the deflection of leaf spring 16 alone is insufficient to produce uniform ride characteristics under low load conditions. The change of the ride height provided by a suspension system embodying the present invention is equal to the sum of the deflections of leaf spring 16, torsion bar spring 26 and tire 15. This deflection is represented by the plot F of FIGURE 6 and is equal to the sum of plots A, C and E. It will be noted that this plot produces substantially constant ride characteristics under all degrees of loading. This uniformity is achieved by the combined effect of varying the effective length of leaf spring 16 while concurrently varying the portion of the load exerted on leaf spring 16 which is transmitted through torsion bar 27. The change in total spring rate thus produced also is simultaneously accompanied by a change in vehicular ride height to produce the desired ride characteristics.

It is to be understood that this invention is not limited to the exact construction shown and described but that various changes and modifications may be made without departing from the spirit and scope of the invention, as defined in the appended claims.

What is claimed as new is:

1. In a suspension system for motor vehicles having a sprung member and an unsprung member, first spring means operatively disposed between said members to transmit loads therebetween, said spring means coacting with said first spring means whereby at least a portion of the loads transmitted by said first spring means is transmitted through said second spring means, and means positionable to vary the rate of said first and second spring means to simultaneously increase the distance between said sprung member and said unsprung member and decrease the portion of the load transmitted through said second spring means.

2. In a suspension system for motor vehicles having a sprung member and an unsprung member; first spring means operatively disposed between said members to transmit loads therebetween; second spring means coacting with said first spring means whereby at least a portion of the load transmitted by said first spring means is transmitted through said second spring means; and means positionable to vary the combined rate of said first and second spring means to simultaneously increase the distance between said members, the effective rate of said first spring means, and decrease the portion of the load transmitted through said second spring means whereby vehicular ride level and ride rate are simultaneously adjusted.

3. In a suspension system for motor vehicles having a sprung member and an unsprung member; first spring means operatively interconnecting said members to transmit loads therebetween; additional spring means interposed between said first spring means and one of said members whereby a portion of the loads exerted upon said first spring means is transmitted through said additional spring means; movable means coacting with said first spring means about which the latter deflects upon the application of loads; and means coacting with said movable means and said additional spring means to concurrently change the point of contact between said movable means and said first spring means, thereby increasing the distance between said members and decreasing the portion of the loads transmitted through said additional spring means to simultaneously adjust vehicular ride level and ride rate.

4. In a suspension system for motor vehicles having a sprung member and an unsprung member, a leaf spring transmitting loads between said members, a torsion bar spring interpositioned between said leaf spring and said sprung member whereby a portion of the load exerted upon said leaf spring is transmitted through said torsion bar spring, and means coacting with said leaf spring and said torsion bar spring to concurrently increase the distance between said members and decrease the portion of the load transmitted through said torsion bar whereby the vehicular ride level and ride rate are simultaneously adjusted.

5. In a suspension system for motor vehicles having a sprung member and an unsprung member; a leaf spring transmitting loads between said members; a torsion bar spring operatively interposed between said leaf spring and said sprung member whereby a portion of the load exerted upon said leaf spring is transmitted through said torsion bar spring; movable means coacting with said leaf spring means about which the latter deflects upon the application of loads; and means coacting with said movable means and said torsion bar spring to concurrently change the point of contact between said movable means and said leaf spring, thereby increasing the distance between said members and decreasing the portion of the load transmitted through said torsion bar whereby the vehicular ride level and ride rate are sumultaneously adjusted.

6. In a suspension system for motor vehicles having a sprung member and an unsprung member; a leaf spring; first means operatively connecting said sprung member and said leaf spring contiguous to one end of the latter; second means operatively connecting said unsprung member and said leaf spring at a position spaced from said one end; third means contacting said leaf spring at a position spaced from said first and said second means about which said leaf spring deflects upon the application of loads imposed thereon; a torsion bar spring operatively connected to said sprung member; adjustable lever means connecting said third means and said torsion bar spring whereby a portion of the load exerted upon said leaf spring is transmitted through said torsion bar spring; and means connected to said lever means positionable to effectively change the angular position of said lever means to vary the point of contact between said third means and said leaf spring means, thereby concurrently increasing or decreasing the distance between said sprung and said unsprung members while decreasing or increasing respectively the portion of the load transmitted through said torsion bar spring to simultaneously adjust the vehicular ride level and ride rate.

7. In a wheel suspension for motor vehicles having a sprung member and an unsprung member; a leaf spring; first means operatively connecting said sprung member and said leaf spring contiguous to one end of the latter; second means operatively connecting said unsprung member and said leaf spring at a position spaced from said one end; third means contacting said leaf spring at a position spaced from said first and said second means about which said leaf spring deflects upon the application of loads imposed thereon; torsion bar spring means pivotally supported by said sprung member; adjustable lever means operatively connecting one end of said torsion bar spring and said third means whereby a portion of the load exerted upon said leaf spring is transmitted through said torsion bar spring, and positioning means operatively connected to said torsion bar spring and positionable to cause pivotal movement of the latter and said adjustable lever means to concurrently change the point of contact between said third means and said leaf spring means, thereby increasing or decreasing the distance between said sprung member and said unsprung member while decreasing or increasing respectively the portion of the load transmitted through said torsion bar spring to simultaneously adjust the vehicular ride level and ride rate.

8. In a wheel suspension for motor vehicles having a sprung member and an unsprung member; a leaf spring; first means operatively connecting said sprung member and said leaf spring contiguous to one end of the latter; second means operatively connecting said unsprung member and said leaf spring at a position spaced from said one end; third means contacting said leaf spring contiguous to the other end thereof about which said leaf spring deflects upon the application of loads imposed thereon; a torsion bar spring pivotally supported contiguous to one end thereof by said spring member; lever means operatively connecting said third means and said torsion bar spring contiguous to said one end thereof whereby a portion of the load exerted upon said leaf spring is transmitted through said torsion bar spring; and power operated positioning means operatively connected to said torsion bar spring at a point spaced from said one end thereof and positionable to cause pivotal movement of said torsion bar spring and said lever means to concurrently change the point of contact between said third means and said leaf spring, thereby increasing or decreasing the vertical distance between said third means and said sprung member while decreasing or increasing respectively the portion of the load transmitted through said torsion bar spring to simultaneously adjust the vehicular level and ride height.

9. In a wheel suspension for motor vehicles, a sprung portion, an unsprung portion, a leaf spring having one end connected to said sprung portion, said leaf spring deflecting about said one end upon the application of loads, a movable roller means in engagement with a portion of said leaf spring at the other end thereof, said leaf spring being connected to said unsprung portion of the vehicle, a torsion bar spring pivotally supported from said sprung portion, a swingable first lever connecting said roller means with one end of said torsion bar spring whereby a portion of the load exerted upon said leaf spring is transmitted by said first lever through said torsion bar spring, a second lever connected to said torsion bar spring, and a positioning means carried by said sprung portion and operatively connected to said second lever, said positioning means positionable to cause swinging movement of said second lever, said second lever upon being pivoted twisting said torsion bar spring and causing swinging movement of said first lever to concurrently change the point of engagement of said roller means with said end porttion of the leaf spring, thereby increasing or decreasing the vertical distance between said other leaf spring and said sprung portion while decreasing or increasing respectively the portion of load transmitted through said torsion bar spring to adjust the vehicular level and ride height simultaneously.

References Cited in the file of this patent

UNITED STATES PATENTS

| | | |
|---|---|---|
| 2,068,676 | Hickman | Jan. 26, 1937 |
| 2,227,762 | Ronning | Jan. 7, 1941 |
| 2,259,827 | McReynolds | Oct. 21, 1941 |
| 2,771,303 | Frazier | Nov. 20, 1956 |
| 2,942,871 | Kraus | June 20, 1960 |
| 3,083,034 | Hollowell | Mar. 26, 1963 |

FOREIGN PATENTS

| | | |
|---|---|---|
| 1,012,533 | Germany | July 18, 1957 |
| 20,998 | Great Britain | 1910 |
| 28,396 | Great Britain | 1912 |